US012326030B2

(12) United States Patent
Kosugi

(10) Patent No.: US 12,326,030 B2
(45) Date of Patent: Jun. 10, 2025

(54) REMOTE CONTROL SYSTEM, CONTROL DEVICE, AND NON-TRANSITORY COMPUTER-READABLE MEDIUM

(71) Applicant: KABUSHIKI KAISHA TOKAI RIKA DENKI SEISAKUSHO, Aichi (JP)

(72) Inventor: Masanori Kosugi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 330 days.

(21) Appl. No.: 17/902,122

(22) Filed: Sep. 2, 2022

(65) Prior Publication Data

US 2023/0083370 A1 Mar. 16, 2023

(30) Foreign Application Priority Data

Sep. 13, 2021 (JP) ................................ 2021-148479

(51) Int. Cl.
*E05F 15/73* (2015.01)

(52) U.S. Cl.
CPC ........... *E05F 15/73* (2015.01); *E05Y 2400/44* (2013.01); *E05Y 2400/858* (2013.01); *E05Y 2900/531* (2013.01); *E05Y 2900/546* (2013.01)

(58) Field of Classification Search
CPC ................ E05F 15/73; E05F 2015/763; E05F 2015/765; E05F 2015/767; E05F 15/655;
(Continued)

(56) References Cited

U.S. PATENT DOCUMENTS

2015/0025751 A1* 1/2015 Sugiura .................... B60J 5/101 701/49
2018/0163454 A1 6/2018 Motoki et al.
(Continued)

FOREIGN PATENT DOCUMENTS

DE 102014101661 8/2015
DE 102017129151 A1 * 6/2019
(Continued)

OTHER PUBLICATIONS

Schodel, Machine translation of DE-102017129151-A1 (Year: 2019).*
(Continued)

*Primary Examiner* — Aaron L Troost
*Assistant Examiner* — Patrick Daniel Mohl
(74) *Attorney, Agent, or Firm* — GREENBLUM & BERNSTEIN, P.L.C.

(57) ABSTRACT

A sensor outputs distance information indicating a first distance to a first object located in a detection area and a second distance to a second object located in the detection area. A control device allows an operation control of a device to be controlled based on a fact that the distance information satisfies prescribed conditions that include: i) a condition that the first distance and the second distance exhibit changes corresponding to entries of the first object and the second object into the detection area; and ii) a condition that one of the first distance and the second distance monotonically decreases and then monotonically increases while the other one of the first distance and the second distance maintains a first value.

8 Claims, 5 Drawing Sheets

(58) Field of Classification Search
CPC ................. E05F 15/79; E05Y 2400/44; E05Y 2400/858; E05Y 2900/531; E05Y 2900/546
See application file for complete search history.

(56) References Cited

U.S. PATENT DOCUMENTS

| | | | | |
|---|---|---|---|---|
| 2018/0252017 | A1 | 9/2018 | Hayashi et al. | |
| 2020/0370333 | A1* | 11/2020 | Kubo | E05B 65/10 |
| 2021/0164283 | A1* | 6/2021 | Tamura | B60R 25/24 |
| 2022/0250584 | A1* | 8/2022 | Waszak | G01S 13/56 |
| 2022/0282553 | A1* | 9/2022 | D'Araujo | G01S 13/931 |
| 2023/0018226 | A1* | 1/2023 | Schmidt | G01S 7/415 |
| 2023/0235611 | A1* | 7/2023 | Wroblewski | E05F 15/73 49/31 |
| 2024/0028126 | A1* | 1/2024 | Corner | G06F 3/017 |
| 2024/0051396 | A1* | 2/2024 | Schoedel | H03K 17/955 |

FOREIGN PATENT DOCUMENTS

| | | |
|---|---|---|
| JP | 2014-214472 | 11/2014 |
| JP | 2018-96128 A | 6/2018 |
| JP | 2018-145589 | 9/2018 |

OTHER PUBLICATIONS

Japanese Office Action dated May 7, 2025 issued in Japanese patent application No. 2021-148479 along with an English translation.

* cited by examiner

REMOTE CONTROL SYSTEM, CONTROL DEVICE, AND NON-TRANSITORY COMPUTER-READABLE MEDIUM

CROSS-REFERENCE TO RELATED APPLICATION

The present application is based on Japanese Patent Application No. 2021-148479 filed on Sep. 13, 2021, the entire contents of which are incorporated herein by reference.

BACKGROUND

The presently disclosed subject matter relates to a remote control system configured to remotely control a device to be controlled based on an action of a user. The presently disclosed subject matter also relates to a control device included in the remote control system, as well as a non-transitory computer-readable medium having stored a computer program adapted to be executed by a processor installed in the control device.

Japanese Patent Publication No. 2018-096128A discloses a system for controlling the opening and closing of a door of a vehicle, that is an example of the device to be controlled, based on an action of a user. When the user performs a kick action for causing a foot to enter a detection area of a kick sensor installed in the vehicle, the opening and closing of the door of the vehicle is allowed.

SUMMARY

It is demanded to improve the convenience of a remote control system configured to remotely control a device to be controlled based on an action of a user.

An illustrative aspect of the presently disclosed subject matter provides a remote control system, comprising:

- a sensor configured to output distance information indicating a first distance to a first object located in a detection area and a second distance to a second object located in the detection area; and
- a control device configured to allow an operation control of a device to be controlled based on a fact that the distance information satisfies prescribed conditions that include:
  - a condition that the first distance and the second distance exhibit changes corresponding to entries of the first object and the second object into the detection area; and
  - a condition that one of the first distance and the second distance monotonically decreases and then monotonically increases while the other one of the first distance and the second distance maintains a first value.

An illustrative aspect of the presently disclosed subject matter provides a control device, comprising:

- an interface configured to accept, from a sensor, distance information a first distance to a first object located in a detection area and a second distance to a second object located in the detection area; and
- a processor configured to allow an operation control of a device to be controlled based on a fact that the distance information satisfies prescribed conditions that include:
  - a condition that the first distance and the second distance exhibit changes corresponding to entries of the first object and the second object into the detection area; and
  - a condition that one of the first distance and the second distance monotonically decreases and then monotonically increases while the other one of the first distance and the second distance maintains a first value.

An illustrative aspect of the presently disclosed subject matter provides a non-transitory computer-readable medium having stored a computer program adapted to be executed by a processor installed in a control device, the computer program being configured to cause, when executed, the control device to:

- accept, from a sensor, distance information indicating a first distance to a first object located in a detection area and a second distance to a second object located in the detection area; and
- allow an operation control of a device to be controlled based on a fact that the distance information satisfies prescribed conditions that include:
  - a condition that the first distance and the second distance exhibit changes corresponding to entries of the first object and the second object into the detection area; and
  - a condition that one of the first distance and the second distance monotonically decreases and then monotonically increases while the other one of the first distance and the second distance maintains a first value.

The first condition described above is satisfied in a case where a user places a first portion and a second portion of his/her body in the detection area of the sensor. The second condition described above is satisfied in a case where the user performs an action in which one of the first portion and the second portion of his/her body is caused to approach the sensor and then returned to the original position while keeping the position of the other one of the first portion and the second portion of his/her body. The control device is configured to perform the operation control of the device to be controlled in a case where both of the two conditions described above are satisfied.

In order to avoid a situation that the operation control of the device to be controlled is performed without being based on the prescribed action performed by the user due to the fact that the sensor erroneously detects an object other than the user's body, the position of the detection area of the sensor for detecting the user's action is generally restricted. For example, in the case of the configuration described in Japanese Patent Publication No. 2018-096128A, the user must approach the foot to the sensor very closely.

On the other hand, according to the configuration of each of the illustrative aspects described above, since the user is required to hold one of the first portion and the second portion of his/her body at the same position somewhere in the detection area as one of the conditions for allowing the operation control of the device to be controlled, it is possible to avoid a situation that the operation control of the device to be controlled is unintentionally executed due to a fact that an object accidentally passing through the detection area is detected by the sensor. In addition, since the user is required to perform an action in which one of the first portion and the second portion of his/her body is caused to approach the sensor and then returned to the original position while keeping the position of the other one of the first portion and the second portion of his/her body as one of the conditions for allowing the operation control of the device to be controlled, the control is never executed based on a mere fact that an object standing still is detected in the detection area. For example, the operation control of the device to be controlled is not executed by such an action that the user merely walks to approach the sensor or moves a portion of his/her body unintentionally.

For example, since the two conditions described above are naturally satisfied in a case where a kick action is performed with one foot while keeping the position of the other foot, the presence of the above conditions does not impose a burden on the user. In addition, the determination as to whether the remote control is allowed is not affected even in a case where the user begins such an action immediately after the user enters the detection area. Accordingly, it is possible to alleviate the restriction in connection with the position of the detection area of the sensor while suppressing the occurrence of a situation that the operation control of the device to be controlled happens to be executed unintentionally. Accordingly, it is possible to improve the convenience of the remote control system configured to remotely control the device to be controlled based on the action of the user.

DESCRIPTION OF EMBODIMENTS

Exemplary embodiments will be described in detail below with reference to the accompanying drawings. In each of the drawings, the scale is appropriately changed in order to make each element illustrated have a recognizable size.

Figure 1:
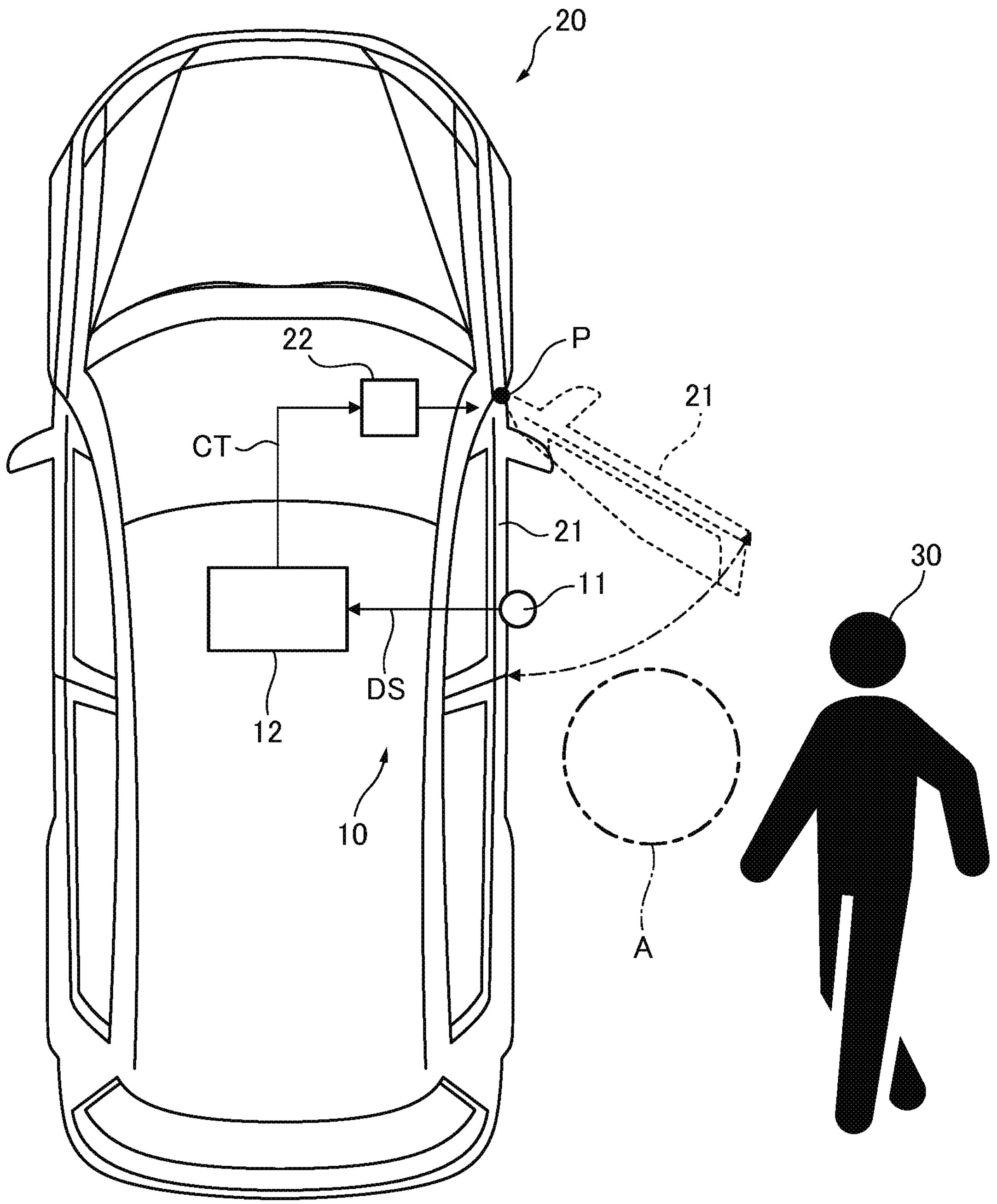
FIG. 1 illustrates a configuration of a remote control system according to an embodiment.

As illustrated in FIG. 1, a remote control system 10 according to an embodiment is installed in a vehicle 20. The remote control system 10 is configured to control an opening/closing operation of the door 21 installed in the vehicle 20 based on an action of the user 30. The shape of the vehicle 20 is merely illustrative. The vehicle 20 is an example of a mobile entity. The door 21 is an example of a reclosable body.

The remote control system 10 includes a sensor 11. The sensor 11 is configured to output distance information DS indicating a distance to each of objects to be detected that are located in a detection area A. The sensor 11 may be implemented by an ultrasonic transducer, an infrared ranging sensor, a TOF (Time of Flight) camera, or the like.

The remote control system 10 includes a control device 12. The control device 12 is configured to control the operation of the opening/closing device 22 based on the distance information DS satisfying prescribed conditions. The opening/closing device 22 is a device configured to automatically open/close the door 21 of the vehicle 20. The opening/closing device 22 is an example of a device to be controlled.

Figure 2:
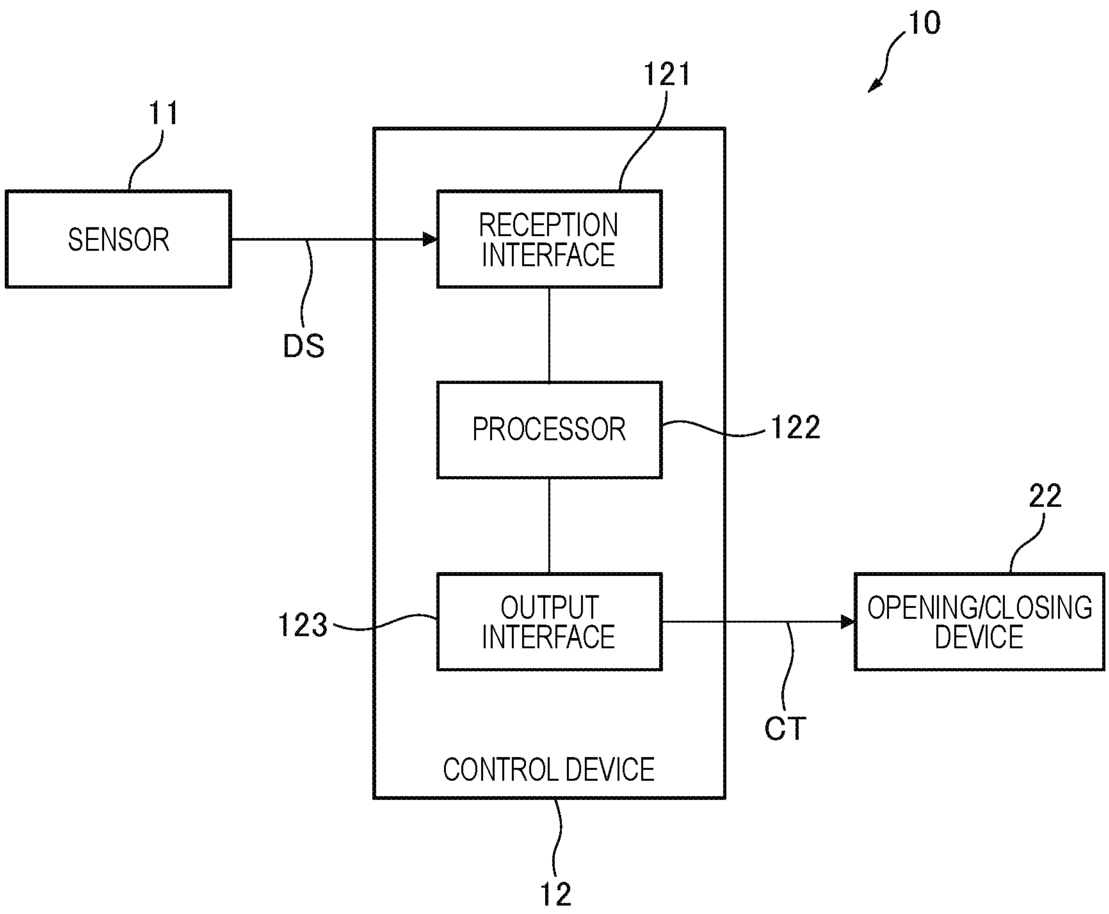
FIG. 2 illustrates a functional configuration of the remote control system of FIG. 1.

As illustrated in FIG. 2, the control device 12 includes a reception interface 121. The reception interface 121 is configured as an interface for accepting the distance information DS from the sensor 11. The distance information DS may be in the form of analog data or digital data. In a case where the distance information DS is in the form of analog data, the reception interface 121 includes an appropriate conversion circuit including an A/D converter.

The control device 12 includes a processor 122 and an output interface 123. The processor 122 is configured to output a control signal CT from the output interface 123 in a case where the distance information DS accepted by the reception interface 121 satisfies prescribed conditions. The control signal CT is configured to cause the opening/closing device 22 to perform an opening/closing operation of the door 21.

In other words, the output interface 123 is configured as an interface capable of outputting the control signal CT. The control signal CT may be an analog signal or a digital signal. In a case where the control signal CT is an analog signal, the output interface 123 includes an appropriate conversion circuit including a D/A converter.

Figure 3:
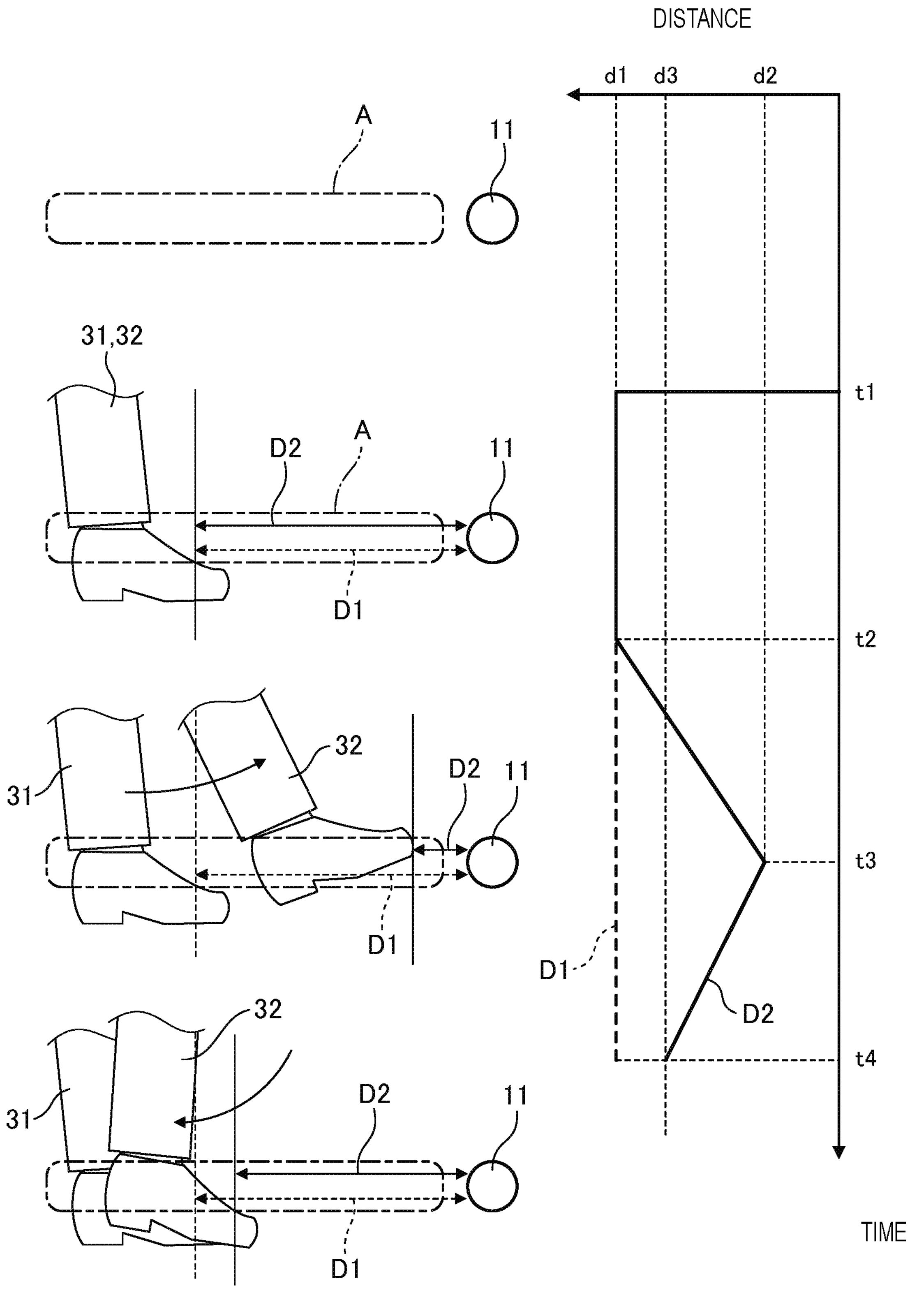
FIG. 3 illustrates a user's action to detected by the remote control system of FIG. 1.

Referring to FIG. 3, the prescribed conditions relating to the distance information DS will be described. In this example, the detection area A of the sensor 11 is set at a position capable of detecting a left foot 31 and a right foot 32 of the user 30 as the objects to be detected. The left foot 31 is an example of a first object. The right foot 32 is an example of a second object.

Namely, the distance information DS includes information relating to a first distance D1 from the sensor 11 to the left foot 31, and information relating to a second distance D2 from the sensor 11 to the right foot 32. In this example, the sensor 11 is configured to acquire a distance to a closest portion of the left foot 31 located in the detection area A as the first distance D1. Similarly, the sensor 11 is configured to acquire a distance to a closest portion of the right foot 32 located in the detection area A as a second distance D2.

It should be noted that the sensor 11 may be configured as a single device for acquiring both the information relating to the first distance D1 and the information relating to the second distance D2, or may be configured to include a device for acquiring the information relating to the first distance D1 and a device for acquiring the information relating to the second distance D2 independently.

The remote control of the opening/closing device 22 is performed by the user 30 performing a kick action in which one of the left foot 31 and the right foot 32 is moved forward in the detection area A and then returned to the original position. In FIG. 3, it is illustrated a kick action in which the right foot 32 is moved forward and then retuned while keeping the position of the left foot 31.

The above conditions include a first condition that the first distance D1 and the second distance D2 indicated by the distance information DS exhibits a change corresponding to the entry of the left foot 31 and the right foot 32 into the detection area A. In the example illustrated in FIG. 3, the entry of the left foot 31 and the right foot 32 into the detection area A is detected at a time point t1.

The above conditions include a second condition that one of the first distance D1 and the second distance D2 indicated by the distance information DS is monotonically decreased and then monotonically increased while the other one of the first distance D1 and the second distance D2 maintains a first value. This condition requires the user 30 to move one of the left foot 31 and the right foot 32 forward and then to return the same to the original position while keeping the position of the other one of the left foot 31 and the right foot 32.

In the example illustrated in FIG. 3, the change over time of the first distance D1 is indicated by dashed lines, and the change over time of the second distance D2 is indicated by a solid line. After the time point t1, the first distance D1 from the sensor 11 to the left foot 31 indicated by the distance information DS maintains a value d1. On the other hand, between a time point t2 and a time point t3, the second distance D2 from the sensor 11 to the right foot 32 indicated by the distance information DS monotonically decreases from the value d1 to a value d2. Thereafter, from the time point t3 to a time point t4, the second distance D2 monotonically increases from the value d2 to a value d3.

The processor 122 of the control device 12 is configured to output a control signal CT from the output interface 123 in a case where both of the two conditions described above are satisfied. In other words, the opening/closing operation of the door 21 is performed by the opening/closing device 22 in a case where the user 30 places the left foot 31 and the right foot 32 in the detection area A, and performs a kick action in which one of the left foot 31 and the right foot 32 is moved toward the sensor 11 and then returned to the original position while keeping the position of the other one of the left foot 31 and the right foot 32.

Figure 4:
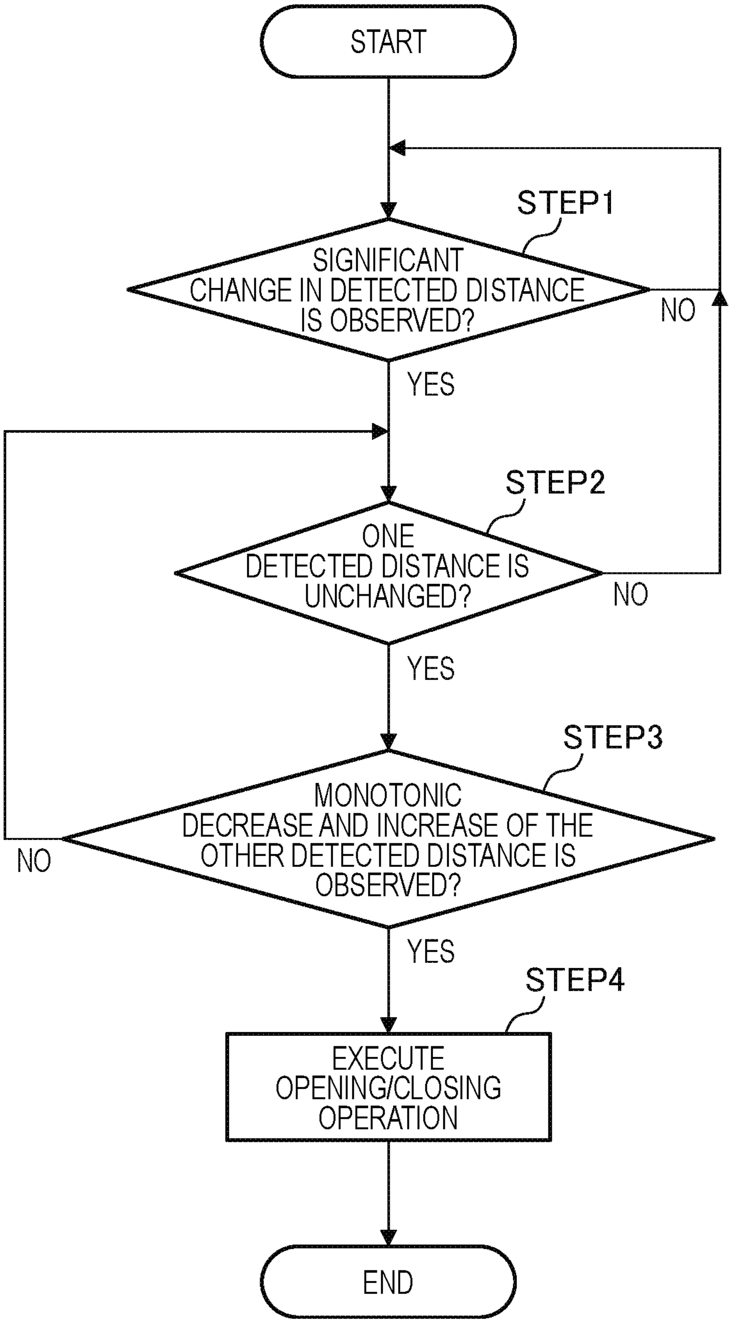
FIG. 4 illustrates a flow of processing to be executed by a processor of FIG. 2.

FIG. 4 illustrates a flow of processing to be executed by the processor 122 of the control device 12 configured as described above.

The processor 122 determines whether a significant change in each of the first distance D1 and the second distance D2 indicated by the distance information DS accepted by the reception interface 121 is observed (STEP1). The "significant change" corresponds to a change in the detected distance that may occur when both of the left foot 31 and the right foot 32 of the user 30 are placed somewhere in the detection area A. The processing is repeated until it is determined that a significant change in the detected distance indicated by the distance information DS is observed (NO in STEP1).

In a case where it is determined that a significant change in each of the first distance D1 and the second distance D2 indicated by the distance information DS is observed (YES in STEP1), the processor 122 determines whether one of the first distance D1 and the second distance D2 maintains an initial value (STEP2). In a case where both the first distance D1 and the second distance D2 are changed (NO in STEP2), the processing returns to STEP1.

In a case where it is determined that one of the first distance D1 and the second distance D2 indicated by the distance information DS maintains the initial value (YES in STEP2), the processor 122 determines whether the other one of the first distance D1 and the second distance D2 indicated by the distance information DS exhibits a change including a monotonic decrease and a subsequent monotonic increase (STEP3). The processing of STEP2 and the processing of STEP3 are repeated until it is confirmed that the change described above is exhibited (NO in STEP3).

In a case where it is confirmed that one of the first distance D1 and the second distance D2 exhibits the change described above while the other one of the first distance D1 and the second distance D2 maintains the initial value (YES in STEP2 and YES in STEP3), the processor 122 outputs the control signal CT for causing the opening/closing device 22 to perform the opening/closing operation of the door 21 from the output interface 123 (STEP4). In a case where the door 21 is opened at the beginning of the kick action of the user 30, a control signal CT for causing the opening/closing device 22 to close the door 21 is outputted. In a case where the door 21 is closed at the beginning of the kick action of the user 30, a control signal CT for causing the opening/closing device 22 to open the door 21 is outputted.

In order to avoid a situation that the opening/closing control of the door is performed without being based on the prescribed action performed by the user due to the fact that the sensor erroneously detects an object other than the user's body, the position of the detection area of the sensor for detecting the user's action is generally restricted. For example, in the case of the configuration described in Japanese Patent Publication No. 2018-096128A, the user must approach the foot to the sensor very closely.

On the other hand, according to the configuration of the present embodiment, since the user 30 is required to hold one of the left foot 31 and the right foot 32 at the same position somewhere in the detection area A as one of the conditions for allowing the opening/closing control of the door 21, it is possible to avoid a situation that the opening/closing control of the door 21 is unintentionally executed due to a fact that an object accidentally passing through the detection area A is detected by the sensor 11. In addition, since the user 30 is required to perform a kick action with one foot while keeping the position of the other foot as one of the conditions for allowing the opening/closing control of the door 21, the control is never executed based on a mere fact that an object standing still is detected in the detection area A. For example, the opening/closing control of the door 21 is not executed in a case where the user 30 is merely standing in the detection area A to talk with someone.

Since it is normal that a kick action is performed with one foot while keeping the position of the other foot, the condition does not impose a burden on the user 30. In addition, the determination as to whether the remote control is allowed is not affected by a mere fact that the user 30 walks in the detection area A to approach the sensor 11 or a mere fact that the user 30 moves a portion of his/her body unintentionally. Accordingly, it is possible to alleviate the restriction in connection with the position of the detection area A of the sensor 11 while suppressing the occurrence of a situation that the opening/closing control of the door 21 happens to be executed unintentionally. Accordingly, it is possible to improve the convenience of the remote control system 10 configured to remotely control the opening/closing device 22 of the door 21 based on the kick action of the user 30.

For example, in a case where the door 21 is opened or closed with a pivot action about a pivot axis P as illustrated in FIG. 1, the detection area A may be set to a position avoiding a moving path of the door 21 being opened or closed as viewed from a direction along the pivot axis P. In this case, it is possible to facilitate avoidance of interference between the door 21 and a user's body or baggage even though the remote control for opening/closing the door 21 based on the kick action is enabled.

Figure 5:
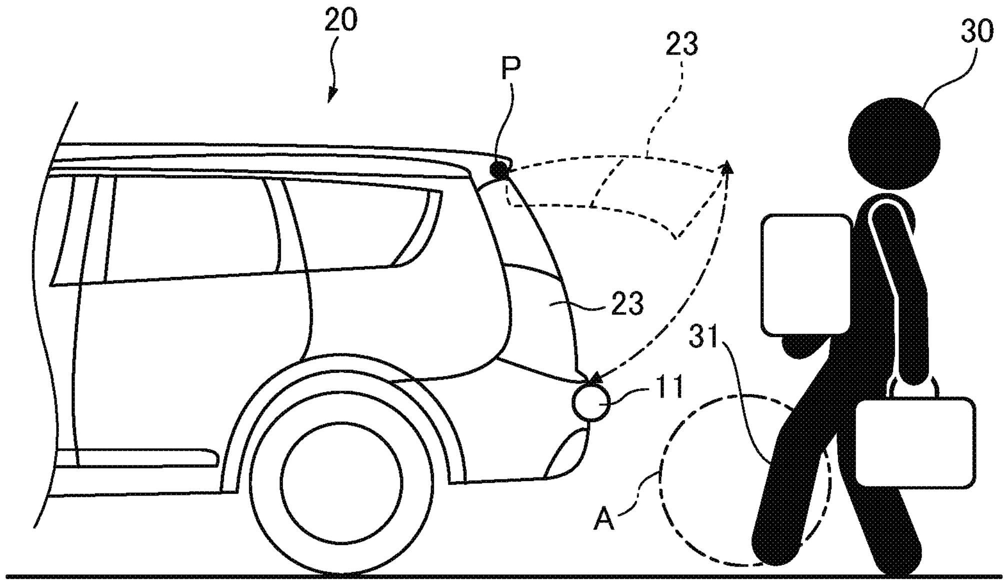
FIG. 5 illustrates a case where an opening/closing control of a back door is performed based on a kick action.

FIG. 5 illustrates a case where a back door 23 of the vehicle 20 is controlled to be opened or closed based on a kick action of the user 30. The back door 23 is also opened and closed with a pivot action about a pivot axis P. The back door 23 is an example of the reclosable body.

Also in this case, the detection area A of the sensor 11 may be set to a position a position avoiding a moving path of the back door 23 being opened or closed as viewed from a direction along the pivot axis P. Accordingly, it is possible to facilitate avoidance of interference between the back door 23 and a user's body or baggage even though the remote control for opening/closing the back door 23 based on the kick action is enabled.

The above conditions may include a condition that one of the first distance D1 and the second distance D2 indicated by the distance information DS is monotonically decreased and then monotonically increased to a second value while the other one of the first distance D1 and the second distance D2 maintains the first value, wherein a difference between the first value and the second value is no greater than a threshold value.

In the example illustrated in FIG. 3, a portion of the right foot 32 that is determined to be located at a position closest to the sensor 11 at each of the start and end of the kick action is generally different depending on a build and/or a posture of the user 30. In addition, the position of the right foot 32 before being placed in the detection area A and the position of the right foot 32 after being returned are not identical in general. Accordingly, the first value and the second value described above need not to be identical. The threshold value as for the difference between the first value and the second value may be determined as a value capable of determining that it is highly probable that a kick action is performed based on the monotonic decrease and increase of the distance.

According to such a configuration, it is possible to enhance accuracy of the determination that the kick action is performed by the user 30 particularly because the position to which one foot is returned after the kick action is determined with reference to the position of the other foot that is kept during the kick action. However, the determination of the position to which one foot is returned after the kick action may be made with reference to a position of the same foot when the kick action is initiated.

In addition, since it can be determined that the kick action is not performed in a case where the monotonic increase of the distance exceeds the threshold value defined for the difference between the first value and the second value, it is possible to suppress the occurrence of a situation that the opening/closing control of the door 21 happens to be executed unintentionally by such an action that the user 30 steps back or turns back in the detection area A.

In order to enhance the accuracy of determination that the kick action is performed, the conditions described above may further include a condition that the change in the distance including the monotonic decrease and the subsequent monotonic increase is finished within a prescribed time length. Examples of the prescribed time length include 1 second. In this case, it is possible to suppress the occurrence of a situation that the opening/closing control of the door 21 is happened to be executed due to a fact that the user 30 unintentionally moves his/her foot in the detection area A. Additionally or alternatively, the conditions described above may further include a condition that an amount of the monotonic decrease exceeds a threshold value.

The processor 122 of the control device 12 having various functions described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having stored a computer program. The general-purpose microprocessor designates at least a part of the computer program stored in the ROM, loads the program on the RAM, and executes the processing described above in cooperation with the RAM. The above-described computer program may be pre-installed in the general-purpose memory, or may be downloaded from an external server device (not illustrated) via a wireless communication network (not illustrated) and then installed in the general-purpose memory. In this case, the external server device is an example of a non-transitory computer-readable medium having stored a computer program.

The processor 122 may be implemented by an exclusive integrated circuit capable of executing the above-described computer program, such as a microcontroller, an ASIC, and an FPGA. In this case, the above-described computer program is pre-installed in a memory element included in the exclusive integrated circuit. The memory element is an example of a non-transitory computer-readable medium having stored a computer program. The processor 122 may also be implemented by a combination of a general-purpose microprocessor and an exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

In the above embodiment, the door that is opened/closed with the pivot action about the pivot axis is subjected to the remote control. However, a bonnet panel or a trunk panel that is opened/closed with a pivot action about a pivot axis in a similar manner may also be subjected to the remote control. A sliding door or an automatic window that is opened/closed with a sliding action along a vehicle body may also be subjected to the remote control. Each of the bonnet panel, the trunk panel, the slide door, and the automatic window is an example of the reclosable body.

In the above embodiment, the remote control is performed based on the kick action of the user 30. However, in view of the advantage that the position of the detection area A of the sensor 11 can be determined with higher flexibility, the remote control may be performed based on an action using portions of the body of the user 30 other than the feet. However, the operation must be performed under a condition that one of the two portions of the body is held at the same position.

The remote control is not limited to the opening/closing control of the reclosable body installed in the vehicle 20. Based on an action of the user 30, an automatic parking support function (including the recovery from the parked state to the travelable state) may be activated. In this case, any one of devices installed in the vehicle for realizing the function may be an example of the device to be controlled.

The remote control system 10 may be installed in a mobile entity other than the vehicle 20. Examples of another mobile entity include railways, aircraft, and ships. Such mobile entities may not require a driver. However, in a case where a specific reclosable body to be subjected to the opening/closing control is shared by a plurality of users, whether the conditions for allowing the opening/closing control requires are approved is determined for each of the users.

The remote control system 10 need not be installed in a mobile entity. Doors and windows in homes and facilities may also be an example of the reclosable body. In addition, various equipment in a house or a facility may be an example of the device to be controlled.

The invention claimed is:

1. A remote control system, comprising:

a sensor configured to output distance information indicating a first distance to a first object located in a detection area and a second distance to a second object located in the detection area;

a control device configured to allow an opening/closing operation control of a reclosable body based on a fact that the distance information satisfies prescribed conditions that include:

a condition that the first distance and the second distance exhibit changes corresponding to entries of the first object and the second object into the detection area;

a condition that one of the first distance and the second distance monotonically decreases and then monotonically increases while the other one of the first distance and the second distance maintains a first value;

a condition that the one of the first distance and the second distance monotonically decreases and then monotonically increases to a second value; and a difference between the first value and the second value is no greater than a threshold value; and opening or closing the reclosable body according to the opening/closing operation control based on the fact that the distance information satisfies the prescribed conditions.

2. The remote control system according to claim 1, wherein the prescribed conditions include a condition that a change in which the one of the first distance and the second distance monotonically decreases and then monotonically increases is finished within a prescribed time length.

3. The remote control system according to claim 1, wherein the detection area is defined at a position capable of detecting a left foot and a right foot of a user as the first object and the second object respectively.

4. The remote control system according to claim 1, wherein the opening/closing operation control is performed on a device for opening/closing the reclosable body.

5. The remote control system according to claim 4, wherein the reclosable body is configured to be opened/closed with a pivot action about a pivot axis; and wherein the detection area is defined in such a position that avoids a path of the pivot action of the reclosable body as viewed from a direction along the pivot axis.

6. The remote control system according to claim 4, wherein the reclosable body is installed in a mobile entity.

7. A control device, comprising:

an interface configured to accept, from a sensor, distance information a first distance to a first object located in a detection area and a second distance to a second object located in the detection area; and a processor configured to allow an opening/closing operation control of a reclosable body based on a fact that the distance information satisfies prescribed conditions that include:

a condition that the first distance and the second distance exhibit changes corresponding to entries of the first object and the second object into the detection area;

a condition that one of the first distance and the second distance monotonically decreases and then monotonically increases while the other one of the first distance and the second distance maintains a first value;

a condition that the one of the first distance and the second distance monotonically decreases and then monotonically increases to a second value; and a difference between the first value and the second value is no greater than a threshold value, wherein the reclosable body opens/closes according to the opening/closing operation control based on the fact that the distance information satisfies the prescribed conditions.

8. A non-transitory computer-readable medium having stored a computer program adapted to be executed by a processor installed in a control device, the computer program being configured to cause, when executed, the control device to:

accept, from a sensor, distance information indicating a first distance to a first object located in a detection area and a second distance to a second object located in the detection area;

allow an opening/closing operation control of a reclosable body based on a fact that the distance information satisfies prescribed conditions that include:

a condition that the first distance and the second distance exhibit changes corresponding to entries of the first object and the second object into the detection area;

a condition that one of the first distance and the second distance monotonically decreases and then monotonically increases while the other one of the first distance and the second distance maintains a first value;

a condition that the one of the first distance and the second distance monotonically decreases and then monotonically increases to a second value; and a difference between the first value and the second value is no greater than a threshold value; and opens or closes the reclosable body according to the opening/closing operation control based on the fact that the distance information satisfies the prescribed conditions.

* * * * *